(12) United States Patent (10) Patent No.: US 7,945,098 B2
Vahey et al. (45) Date of Patent: May 17, 2011

(54) METHOD FOR CHARACTERIZING THE DENSITY AND CROSS-SECTION MORPHOLOGY OF TREES

(75) Inventors: David W. Vahey, Madison, WI (US); JunYong Zhu, Madison, WI (US); Charles Timothy Scott, Mt. Horeb, WI (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 1034 days.

(21) Appl. No.: 11/804,115

(22) Filed: May 17, 2007

(65) Prior Publication Data

US 2008/0285810 A1 Nov. 20, 2008

(51) Int. Cl.
*G06K 9/46* (2006.01)
(52) U.S. Cl. ........................................................ 382/207
(58) Field of Classification Search .................. 382/207, 382/141, 149, 152; 324/650
See application file for complete search history.

(56) References Cited

U.S. PATENT DOCUMENTS

| 5,625,705 | A | * | 4/1997 | Recht | ............................. | 382/128 |
| 6,525,319 | B2 | | 2/2003 | Meglen et al. | | |
| 6,606,568 | B2 | | 8/2003 | Meglen et al. | | |
| 6,888,458 | B2 | | 5/2005 | Carlson | | |
| 2006/0140484 | A1 | * | 6/2006 | Okochi | ......................... | 382/207 |

OTHER PUBLICATIONS

Evans, R, "Rapid Measurement of the Transverse Dimensions of Tracheids in Radial Wood Sections from *Pinus radiata*", Holzforschung, 1994, pp. 168-172, vol. 48, Germany.

Reme, P.A. et al., "Assessment of transverse dimensions of wood tracheids using SEM and imaging analysis", Holz als Roh- und Werkstoff, 2002, pp. 277-282, vol. 60, Germany.
Jang, H.F. et al., "Determining the transverse dimensions of fibers in wood using confocal microscopy", Wood and Fiber Science, 2005, pp. 615-662, United States of America.
Midorikawa, Y. et al., "Transverse shape analysis of xylem ground tissues by Fourier transform image analysis . . . ", Journal of Wood Science, 2005, pp. 201-208, vol. 51, Japan.
Csoka,L. et al., "Application of the Fourier analysis to determine the demarcation between juvenile and mature wood", Jrnl of Wood Science, 2005, pp. 309-311, vol. 51, Japan.
Kibblewhite, R.P. et al., "Fiber length, microfibral angle and wood colour variation and interrelationships . . . ," Appita Jrnl, 2005, pp. 316-322, vol. 58, No. 4, Australia.
Travis, A.J. et al., "Automatic Classification of Plant Cells According to Tissue Type using Anatomical Features . . . ", Annals of Botany, 1996, pp. 325-331, vol. 78, England.
Vahey, D.W. et al., "Wood Density and Anatomical Properties in Suppressed-Growth Trees . . . ," Wood and Fiber Science, expct'd pub. 2007, vol. 39, iss. 4, U.S.A.
Acuna, M.A. et al., Use of near infrared spectroscopy and multivariate analysis . . . ; Forest Prod. Jrnl, 2006, pp. 67-72, vol. 56, No. 11/12, USA.

(Continued)

*Primary Examiner* — Vu Le
*Assistant Examiner* — Claire Wang
(74) *Attorney, Agent, or Firm* — John D. Fado; Lesley D. Shaw; Janet I. Stockhausen (57) ABSTRACT

A method is provided for reliably determining anatomical properties of a tree having a plurality of growth rings spaced from each other in a radial direction. The method involves preparing a sample from a tree to be analyzed, and preparing an image of the sample at a resolution sufficient to analyze at least one of the earlywood and latewood portions of one or more rings. The image is used to determine at least one anatomical property of the sample based on the image, the anatomical property being selected from the group consisting of sample density, tracheid wall thickness, and tracheid exterior dimension.

16 Claims, 8 Drawing Sheets

OTHER PUBLICATIONS

Cown, D.J., "Variation in tracheid dimensions in the stem of a 26-year-old *radiata* pine tree," Appita, 1975, pp. 237-245, vol. 28, No. 24, Australia.

Palviainen, J. et al., "Inspection of wood density by spectrophotometry . . . ," Meas. Sci. Technol., 2001, pp. 345-352, vol. 12, U.K.

Schimleck, L.R. et al., "Estimation of *Pinus radiata* D. Don tracheid morphological . . . ," Holzforschung, 2004, pp. 66-73, vol. 58, Germany.

Schimleck, L.R. et al., "Nondestructive estimation of tracheid length from sections of radial wood . . . ," Holzforschung, 2004, pp. 375-381, vol. 58, Germany.

* cited by examiner

METHOD FOR CHARACTERIZING THE DENSITY AND CROSS-SECTION MORPHOLOGY OF TREES

STATEMENT REGARDING FEDERALLY SPONSORED RESEARCH OR DEVELOPMENT

The United States Government has certain rights in this invention.

RELATED APPLICATION DATA

Not Applicable

BACKGROUND OF THE INVENTION

The present disclosure is generally directed to measuring the anatomical properties of trees, and in particular relates to a method for characterizing the density and cross-section morphology of trees.

The health, conservation and restoration of national forest lands in the United States often requires that the stands be selectively thinned by removing small-diameter trees, many of which exhibit suppressed growth. Suppressed-growth trees make up a significant component of what are known as small-diameter trees, which are trees whose diameters are significantly smaller than expected for mature trees of a given species. To offset the high cost of forest thinning operations, it is desirable to find high value, large volume uses for the removed small-diameter trees. One potential approach would be to use the trees as a source of fiber in paper making processes. Unfortunately, the fiber of small-diameter trees is not conventionally accepted as a reliable source by the pulp and paper industry. While the basic material properties of wood from small-diameter trees indeed differ from those of traditional pulpwood, the industry lacks a proper understanding of the differences and whether they are relevant to the viability of the wood in paper production.

It is well-known that the morphology of wood tracheids, for instance the dimensions of tracheid wall thickness and lumen diameter, and their density, affect the processing and properties of both lumber and paper. Because wood species' anatomy and growth rate dictate the fiber morphology, the understanding and characterization of the differences in fiber morphology of wood from small-diameter trees allows one to predict the variability and thus the viability of the wood in end-use applications such as paper production. For instance, it is believed that greater uniformity in certain anatomical properties between earlywood and latewood could result in an acceptably minimal amount of damage to the wood fibers (or tracheids) in thermomechanical pulping.

Earlywood, also known as springwood, refers to wood tracheids produced by a tree at the beginning of the tree's growing season, and makes up the light-color section in the tree's annular (or growth) ring compared to the tracheids produced during the middle to end of the growing season. Latewood, also known as summerwood, refers to wood tracheids produced by a tree at the end of the tree's growing season, and make up the darker section of the tree's annular ring compared to the cells produced during the middle of the growing season. Earlywood tracheids form the inner portion of the annular ring and are typically thinner walled than latewood, which forms the outer portion of the annular ring.

Conventional methods to analyze the anatomical properties of wood have achieved only limited success.

For instance, one such method involves using near infrared (NIR) spectroscopy techniques. NIR relies on multivariate calibration and requires an established anatomical database specific for each tree species of interest. Unfortunately, the diversity of small-diameter trees makes a useful database difficult to obtain, and such a database is currently unavailable.

Another method involves X-ray densitometry and optical microscopy. While the analysis is capable of quick measurements with good statistical significance, the relatively low spatial resolution used, coupled with line-of-sight measurements through curved growth rings, makes it unsuitable for measurements of density of suppressed-growth trees whose annual rings have a width less than several hundred microns. For instance, if the tracheid layers of a given ring are small compared to the resolution of the scan, individual density measurements can include both earlywood and latewood portions, thus producing results that erroneously indicate a high degree of uniformity between the earlywood and latewood.

Furthermore, the X-ray densitometry and optical microscopy method of calculating wall thickness from measured density and diameter is unreliable for the tracheids of suppressed-growth trees, which are often irregular in shape and substantially thicker in the tangential direction than in the radial direction. Furthermore, the costs of such measurement systems are often prohibitive, thus limiting the availability and usage of the measurement systems throughout the forestry industry. In fact, one such measurement system in existence today is available at only three locations world-wide.

Another conventional system uses confocal laser scanning fluorescence microscopy to produce images of a wood sample. Tracheid geometry was then compared with resulting pulp fiber geometry, however this system does not characterize the anatomical properties of a wood sample from the pith to bark. Furthermore, such systems are labor-intensive. It is therefore unlikely that such a system would be capable of repeat measurements rapidly enough to characterize a tree.

What is therefore needed is a method for reliably determining the anatomical properties of trees and in particular of suppressed-growth trees.

SUMMARY

In accordance with one aspect of the present invention, a method is provided for determining anatomical properties of a tree having a plurality of growth rings spaced from each other in a radial direction. The method includes the step of A) preparing a wood sample from the tree, the wood sample including at least one growth ring comprising a plurality of tracheids each having a tracheid wall, the growth ring defining an earlywood portion and a latewood portion; B) directing a light source to the wood sample so as to illuminate the tracheids of a selected growth ring among the at least one growth ring; C) capturing an image of at least one of the earlywood and latewood portions of the selected growth ring, the image having a pixel resolution less than 2 micrometers ($\mu$m); and D) determining at least one anatomical property of the sample based on the image, the anatomical property being selected from the group consisting of sample density, one or more tracheid wall thicknesses, and one or more tracheid exterior dimensions.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Objects, features, and advantages of the present invention will become apparent upon reading the following description in conjunction with the drawing figures in which like reference numerals are intended to represent like elements throughout, and in which.

DETAILED DESCRIPTION OF THE DISCLOSURE

The present inventors have developed an optical imaging technique that can be utilized to determine the anatomical properties of wood. The imaging technique described herein utilizes a higher resolution compared to conventional imaging techniques, which the inventors have found to both increase the reliability of the results and allow for anatomical calculations that had not been attainable using conventional techniques. The anatomical calculations can be used, for instance, to demonstrate the viability of the wood (particularly wood of suppressed-growth trees) in end-use applications such as pulp production.

Figure 1:
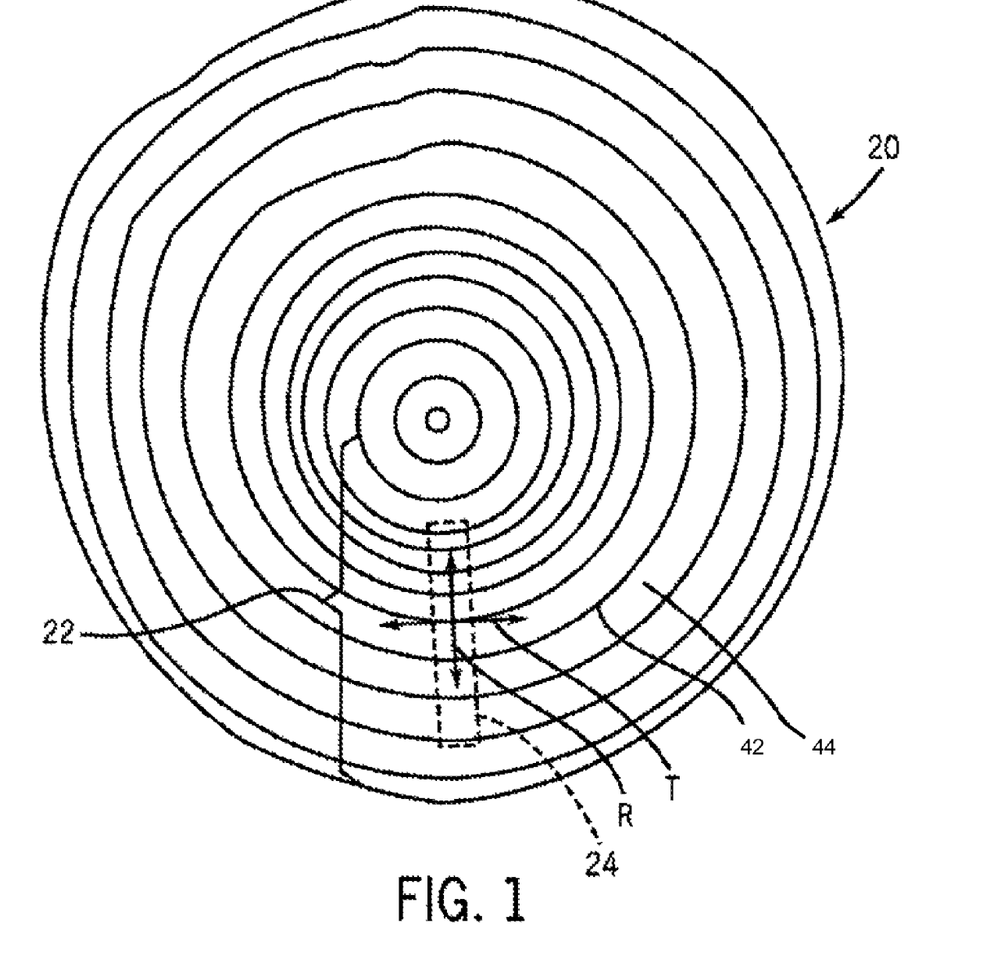
FIG. 1 is an illustration of a cross section of a tree segment illustrating a plurality of growth rings.
Figure 2:
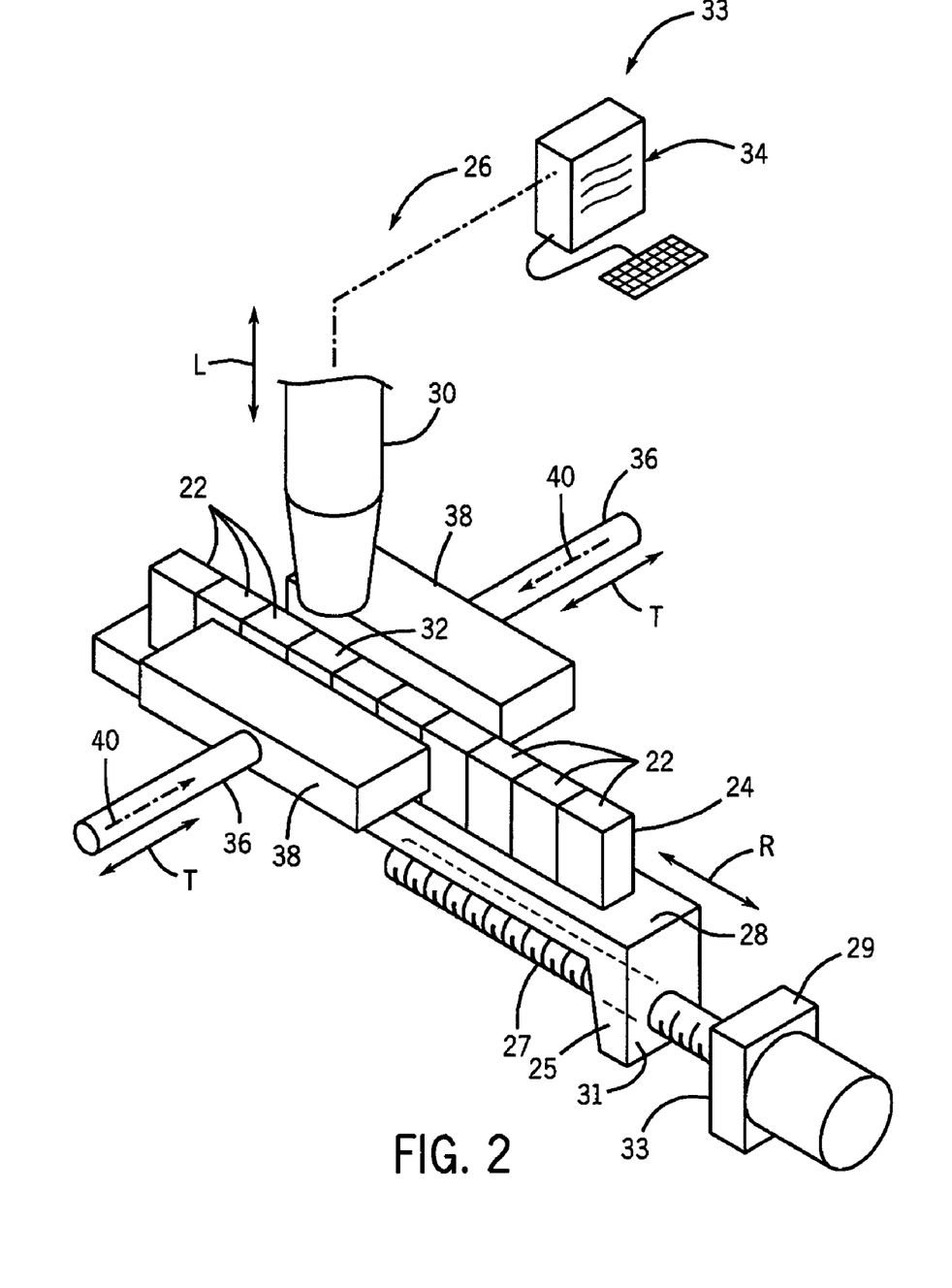
FIG. 2 is a schematic diagram of an optical measurement and data collection system constructed in accordance with the principles of the present invention.

Referring to FIGS. 1 and 2, a cross-section of a tree 20, for instance the trunk or a branch, exhibits a plurality of growth, or annular, rings 22 that each represent a year of the life of the tree where sectioned. A sample 24 can be bored from the tree section 20 and analyzed using an imaging system 26 which includes an optical measurement and data collection system constructed in accordance with the principles of the present invention.

The imaging system 26 includes an image acquisition assembly 30 that can include a microscope and a charge coupled device (CCD) camera. The microscope can be set to any magnification desired, and is set to 20× in accordance with one aspect of the present invention. The camera can be provided as desired, and a standard RS170 black-and-white Hitachi KP-M1 CCD, commercially available from Hitachi, Ltd., located in Tokyo, Japan was provided having a 640 by 480 resolution. The objective lens faces the upper surface 32 of the sample 24 as illustrated. The assembly 30 is connected to an image processing system 33, including a conventional personal computer (PC) 34, that receives signals from the image acquisition assembly 30 and runs imaging and data analysis software of the type described in more detail below. The acquisition assembly 30 can be operated locally or remotely from signals received by the PC 34 as entered by the user.

The sample 24 rests on a base 28, and is oriented to be elongated horizontally in the radial direction R. The radial direction R refers to a direction extending substantially perpendicular to rings between the pith and the bark. The radial direction R thus extends through a given ring in a direction substantially perpendicular to both the earlywood and latewood portions of the ring. The sample 24 is oriented such that the radial direction R extends horizontally. The orientation of the sample is further defined by a tangential directional component T which extends substantially orthogonal with respect to the radial direction R within the plane of a given ring (i.e., extending tangentially to the rings 22). The sample 24 is oriented such that the tangential direction T is horizontal. The orientation of the sample 24 is further defined by a longitudinal component L which is substantially orthogonal to both the radial direction R and the tangential direction T. The sample 24 is oriented such that the longitudinal component L extends vertically. The sample 24 is retained in a housing or clamp 25 that is operably connected to the threaded end of a positioning system having a screw 27 with a known thread pitch. The screw 27 extends through a stationary wall 29 which is disposed between the screw head 31 and a collar 33 such that clockwise and counter clockwise rotation of the screw 27 causes the housing 25 and sample 24 to move back and forth in the radial direction R.

The positioning system can be a three-axis positioning system including the radial direction positioning accommodated by the screw 27, as described above, longitudinal direction L adjustment accommodated by the motion for the camera image; and (3) movement of the sample along the tangential direction T to improve the resulting image.

A pair of fiber optic cable segments 36 extends tangentially toward the sample 24, and each segment 36 terminates at a Fostec light line 38, commercially available as Schott Model A08579 (1 inch dual lightline) from Schott North America, located in Elmsford, N.Y. The light fines 38 abut the sample 24 at about 4 mm below the upper, or viewing, surface 32. A conventional light source 40 (for instance of the kind that produces white light and near infrared radiation, such as that from a xenon bulb) provides electromagnetic radiation that travels through both fiber optic cable segments 36 and into the light lines 38, which have terminations through which the light passes through to illuminate the sample 24. In accordance with one aspect of the present invention, the xenon source can be provided by an EG&G Xenon source, model Xe C100i, once commercially available from PerkinElmer Optoelectronics, located in Fremont, Calif., who is now known as Perkin Elmer, located in Fremont, Calif. While xenon is one preferred light source, any suitable alternative light source capable of illuminating the sample 24 can be used, including a tungsten or halogen light source.

The growth rings 22 extend substantially tangentially across the upper surface 32 of the sample 24 and are exposed to the image acquisition assembly 30. The rings 22 are spaced from one another in the radial direction R, and each individual ring 22 extends substantially tangentially across the upper surface of the sample 24. The number of rings 22 in a given sample can vary as desired.

Example

The sample 24 was imaged with an imaging system having a substantially rectangular field of view of approximately 300 µm in the radial direction R and approximately 233 µm in the tangential direction T, thereby providing a pixel resolution of approximately 0.6 µm. One skilled in the art will appreciate, of course, that the pixel resolution could change depending upon how many pixels are provided within the field of view. It should be appreciated that the size and shape of the sample 24 and the field of view could change without departing from the scope and spirit of the present invention. For instance, increased resolution for improved wall-thickness measurement involves using a field of view that can be less than the entire thickness of the annular ring 22.

It should be appreciated from the description below that high resolutions decrease the likelihood that an image will include both earlywood and latewood portions of a ring 22, except possibly in the case of suppressed-growth trees. It should be further appreciated that as the pixel resolution approaches zero, a greater number of images would be required in order to accurately image the entire earlywood portion 42 or latewood portion 44 of a given ring 22, particularly if the size of those portions are greater than what can be viewed at the pixel resolution. Accordingly, given the range of ring sizes in small growth trees, the present inventors recognize in one aspect of the present invention that the pixel resolution could be less than and including approximately 2 mm, 1 mm, 2 µm, alternatively less than and including approximately 1 µm, and alternatively still less than and including 0.6 µm without departing from the spirit and scope of the present invention. In accordance with another aspect of the present invention, the pixel resolution therefore could be within a range defined at its upper end by approximately 2 mm, 1 mm, 2 µm, alternatively approximately 1 µm, and alternatively approximately 0.6 µm, and defined at its lower end by approximately 0.01 µm, alternatively approximately 0.1 µm, and alternatively still 0.2 µm without departing from the spirit and scope of the present invention.

Figure 3:
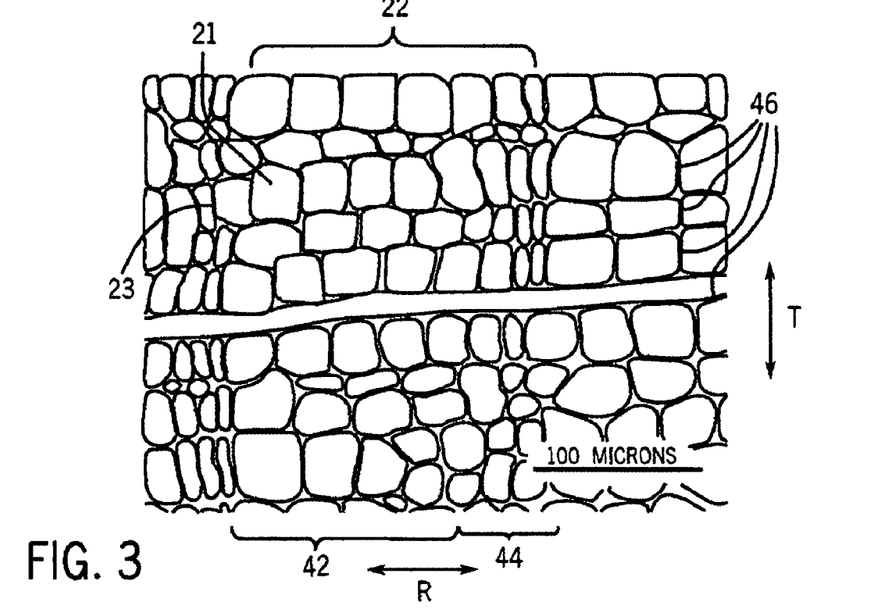
FIG. 3 illustrates an image of a ring of a suppressed growth tree having an earlywood portion and a latewood portion.

FIG. 1 illustrates the location of the earlywood portion 42 as forming the inner portion of a given ring 22, and the latewood portion 44 as forming the outer portion of a given ring 22. In instances where the ring 22 being imaged has a thickness less than the radial dimension of the field of view (e.g., 300 µm) of the microscope, both the earlywood 42 and latewood portions 44 of the ring can be captured in a single image and later analyzed independently. Otherwise, the typical annular ring 22 whose thickness is greater than the radial dimension of the field of view is imaged twice, the first image capturing an earlywood 42 portion of the ring 22, and the second image capturing a latewood portion 44 of the ring 22. An image of the remaining portion of the ring 22 need not be captured for the purposes of determining the extreme anatomical properties of the latewood 44 and earlywood 42 portions. The images include individual tracheids of the annular ring regions of interest that can be analyzed as desired. In mature trees of small diameter, typical annular rings have a radial thickness of approximately 1-3 mm, while annular rings exhibiting suppressed growth can have a radial thickness as little as 160 µm and can contain a corresponding small number of tracheid layers 46 in the radial direction (8 as illustrated), as shown in FIG. 3. FIG. 3 illustrates the various tracheids 21 of the earlywood portion 42 and latewood portion 44 of a given annular ring 22. Each tracheid 21 includes a tracheid wall 23 that defines the outer perimeter of the tracheid 21. Certain aspects of the present invention advantageously enable measurements regarding tracheid wall thickness, as is described in more detail below.

While the tree section 20 of FIG. 1 illustrates the methodology involved in creating a sample of the type described herein, it should be understood that the actual sample 24 analyzed below was not derived from the tree section 20 illustrated in FIG. 1, but was instead taken from the core of a Douglas-fir tree (i.e., one having both suppressed and normal growth over different parts of its lifetime). The average growth-ring widths were about 1.33 mm in the normal growth regions, and 0.24 mm in the regions of suppressed growth. The largest suppressed-growth ring width was 0.45 mm. The dimensions of the sample 24 can be selected as desired, and were chosen to be 65 mm in the radial direction R, 2 mm in the tangential direction T, and 7 mm in the longitudinal direction, as illustrated. The sample 24 was taken to include the ring 22 adjacent the bark and those rings disposed sequentially inward from that ring 22 to the pith, though of course any series of rings could be measured as desired using the principles of the present invention.

Figure 4:
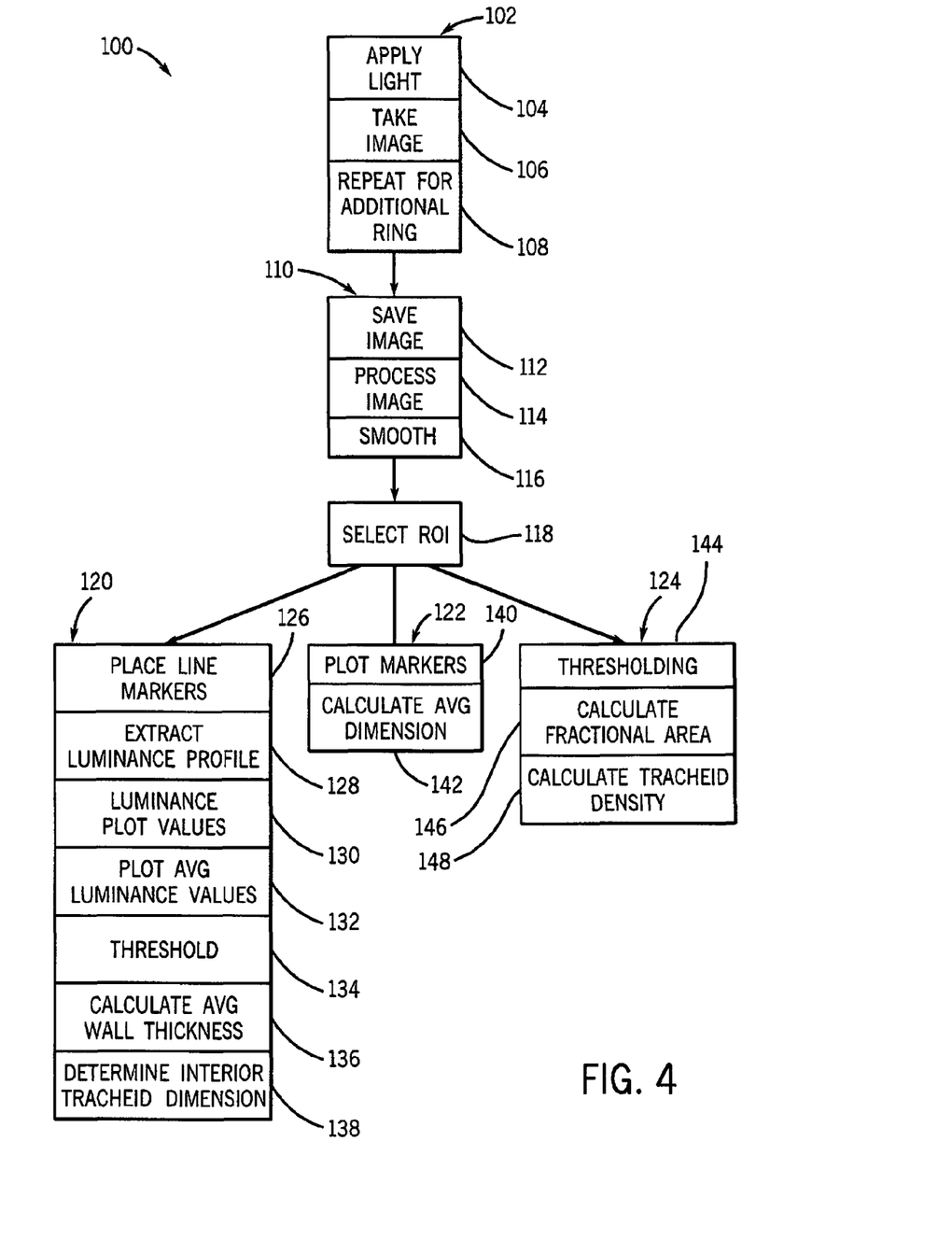
FIG. 4 is a flow chart illustrating the method of analyzing a wood sample in accordance with certain aspects of the present invention.

The process 100 for determining various anatomical properties of the tree based on the sample 24 is illustrated in FIG. 4. The first step 102 in the process 100 was to prepare an electronic image of the sample 24. Specifically, at step 104, output from the lamp 40 was applied to both fiber optic cables 36 and diffused through the light lines 38 to illuminate the sample 24. A portion of the electromagnetic radiation entering the sample 24 was captured by the walls of the individual tracheids 23 and diffused along the length of the tracheids 46 up to the viewing surface 32. Most of this was red light or near-infrared radiation, so that the tracheid wall was illuminated while the lumen was dark. Next, at step 106, the microscope magnified the image 20× and captured the light and near-infrared radiation emitted at the viewing surface 32 and imaged it on the camera. It should be appreciated that light can alternatively be directed down toward the viewing surface 32, and reflected back up to the to the image acquisition assembly 30. Alternatively still, light and near-infrared radiation can be emitted into the bottom of the sample, and can propagate to the viewing surface to produce an image that can be acquired with the image acquisition assembly. If the light and near-infrared radiation is emitted into the bottom of the sample, it may be desired to use a source 40, fiber optics 36 and light lines 38 optimized for radiation having wavelengths in the near-infrared spectrum to allow the radiation to propagate through the wood along the longitudinal direction L to the viewing surface 32.

At step 108, the sample 24 was moved in the radial direction R by rotating the screw 27 having a known pitch and the next image was sampled by repeating steps 104 and 106 until all desired images had been captured. While the pitch can of course be selected as desired, the pitch used in this instance was 1.57 turns/mm (40 turns/inch). Each ring 22 was imaged, beginning with the ring 22 nearest the bark and continuing to the ninth ring 22 from the pith. It was determined that the amount of light was insufficient for a useful image after the ninth ring 22. If a single image was not sufficiently large to capture both the early wood 42 and latewood 44 portions of the ring 22, then two images of the ring 22 would be taken as described above. If two images were needed to capture the ring 22, the width of each ring 22 would be determined from the known pitch of the screw 27 and the amount of rotation of the screw 27 necessary to move from the beginning to the end of the ring 22. If one image captured the entire ring 22, the width of the ring 22 could be measured based either on the number of screw turns, or based on the known field of view and image size.

Next, at step 110, the image was processed prior to being analyzed. The image can be saved in any desirable format and processed by the PC 34 running any suitable software. In this example, the image was saved as a JPEG file at step 112, and at step 114 was processed using a suitable software, such as Optimas software, version 5.23, commercially available from Media Cybernetics, located in Silver Spring, Md., running on PC 34. Prior to measuring the various anatomical properties of the various rings 22 based on the images, the images were first smoothed at step 116 with the Optimas software to reduce the influence of lighting nonuniformity on the measurements to produce the smoothed image 45 illustrated in FIG. 5.

Figure 5:
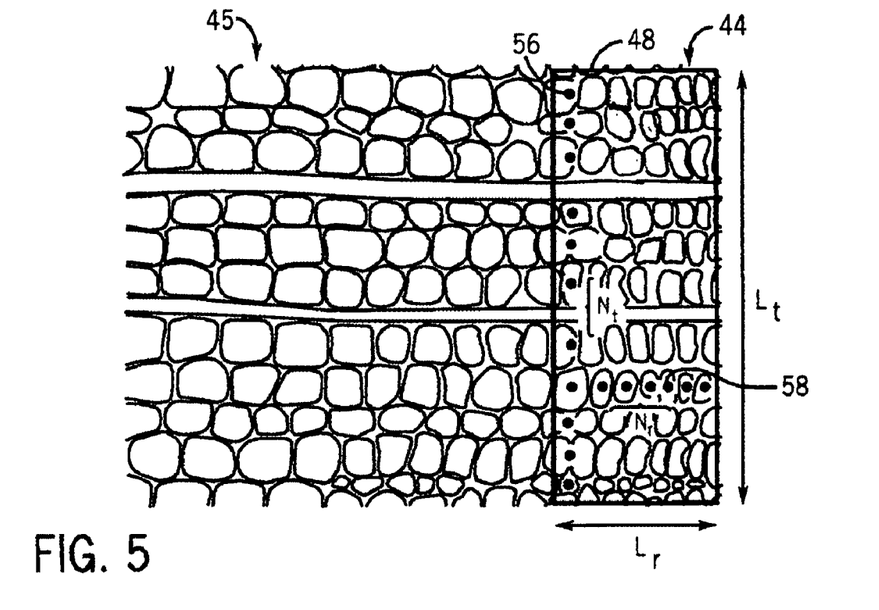
FIG. 5 is an image of a wood section showing a region of interest used to calculate tracheid wall thickness and tracheid diameter.

Next, at step 118, a region of interest 48 within the image was selected that included either the first earlywood 42 or the last latewood 44 (depending on what portion of the ring was to be measured) that had the same general appearance in terms of tracheid size and wall thickness, as appreciated by one having ordinary skill in the art. The radial and tangential dimension of the region of interest 48 could be determined based on calibration in light of the known size of the image. As illustrated in FIG. 5, the region of interest 48 was selected as the latewood portion 44 of the ring 22 having a thickness of approximately 70 μm in the radial direction R.

With the smoother image 45 obtained, various desired anatomical properties of the region of interest 48 could be determined. For instance, the thickness of each tracheid wall 23 and the average exterior tracheid dimension (defined as the distance across the interior of the tracheid between opposing outer tracheid wall edges in a given direction plus the thickness of each opposing tracheid wall) were determined using method 120. The exterior tracheid dimension can also be determined using method 122. Of course, the average interior dimension (defined as the distance across the interior of the tracheid between opposing outer tracheid wall edges) can be determined by subtracting the tracheid wall thickness from the average exterior tracheid dimension. Furthermore, the density of the wood sample 24 can be determined using method 124.

Referring to method 120, a line scan technique was adopted to determine the diameter and thickness of each tracheid 21. Specifically, at step 126, one or more line markers 50 (see FIGS. 5-6) were placed into the region of interest 48 to cut across the walls 23 of adjacent tracheids 21. The line markers 50 can extend in the radial direction R or in the tangential direction T depending upon whether it is desired to determine the radial or tangential diameter and thickness of the tracheid 21. At step 128, the Optimas software extracted a profile of luminance values along the line markers. At step 130, the luminance values were obtained and plotted at line 52, and the maximum value can be recorded. At step 132, the rolling average luminance values were plotted at dashed line 54. At step 134, a thresholding step was performed in which tracheid wall was determined to be the region having an actual luminescence greater than that of a predetermined threshold. In accordance with one aspect of the present invention, the predetermined threshold is the rolling average luminescence at the location being analyzed. At step 136, the thickness of each wall was added and divided by the number of walls (bearing in mind that each wall was actually a double wall for adjacent tracheids) to arrive at an average wall thickness.

One skilled in the art will appreciate that any desired number of linear profiles can be obtained, with each linear profile crossing as many double walls as desired. It has been determined that one suitable approach is to process between three and seven, and preferably five, linear profiles, each of which crosses between two and four, and preferably three, double walls. With five linear profiles crossing three double walls, fifteen measurements can be obtained.

Figure 6:
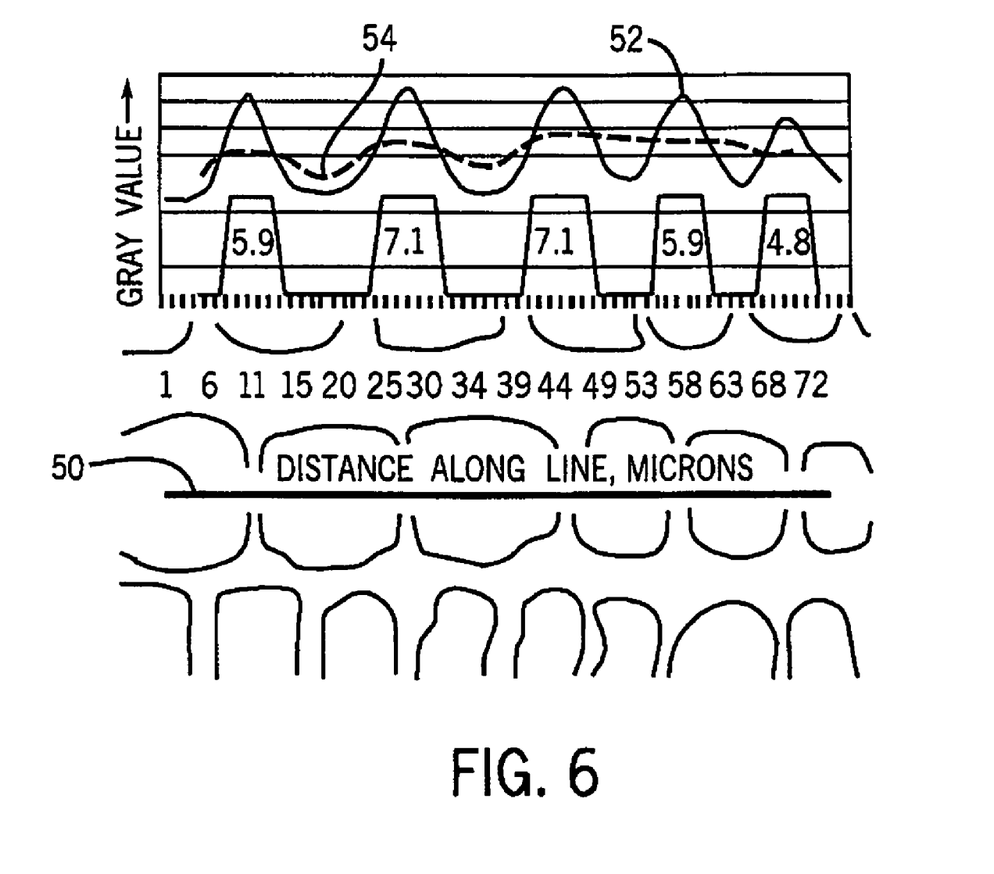
FIG. 6 is an image of a wood sample illustrating a line sample technique used to determine the diameter and thickness of the tracheids of the sample in accordance with certain aspects of the present invention.

Once the thickness of the tracheid walls 23 was determined, the exterior dimension of a given tracheid 21 can be determined at step 138 by adding a double wall thickness to the distance across an adjacent lumen, which can be determined as the distance along the marker 50 corresponding to an actual luminance less than the rolling luminance average, so long as a lumen region is not so large so as to cause the actual luminance and the rolling average to approach zero. Step 138 recognizes that the average thickness of a double wall is equal to the thickness of two single walls plus the thickness of the middle lamella, which is negligible, each wall therefore having approximately half the thickness of the double wall. Alternatively, the distance between luminescence peaks at line 52 could be measured. Alternatively, a marker 50 was drawn from the boundary of one lumen with its adjacent double wall to the symmetrical boundary of the neighboring lumen. Since the marker so drawn spans one lumen (corresponding to the interior dimension of the tracheid) and one double wall thickness, the length of the marker 50 is approximately equal to the exterior dimension of the corresponding tracheid. As described above, if line markers 50 extend in the radial direction R, then the radial tracheid wall thickness and radial exterior dimensions are determined. The method 120 could be repeated using tangentially extending lines to determine the tangential tracheid wall thickness and tangential exterior dimensions.

Figure 7:
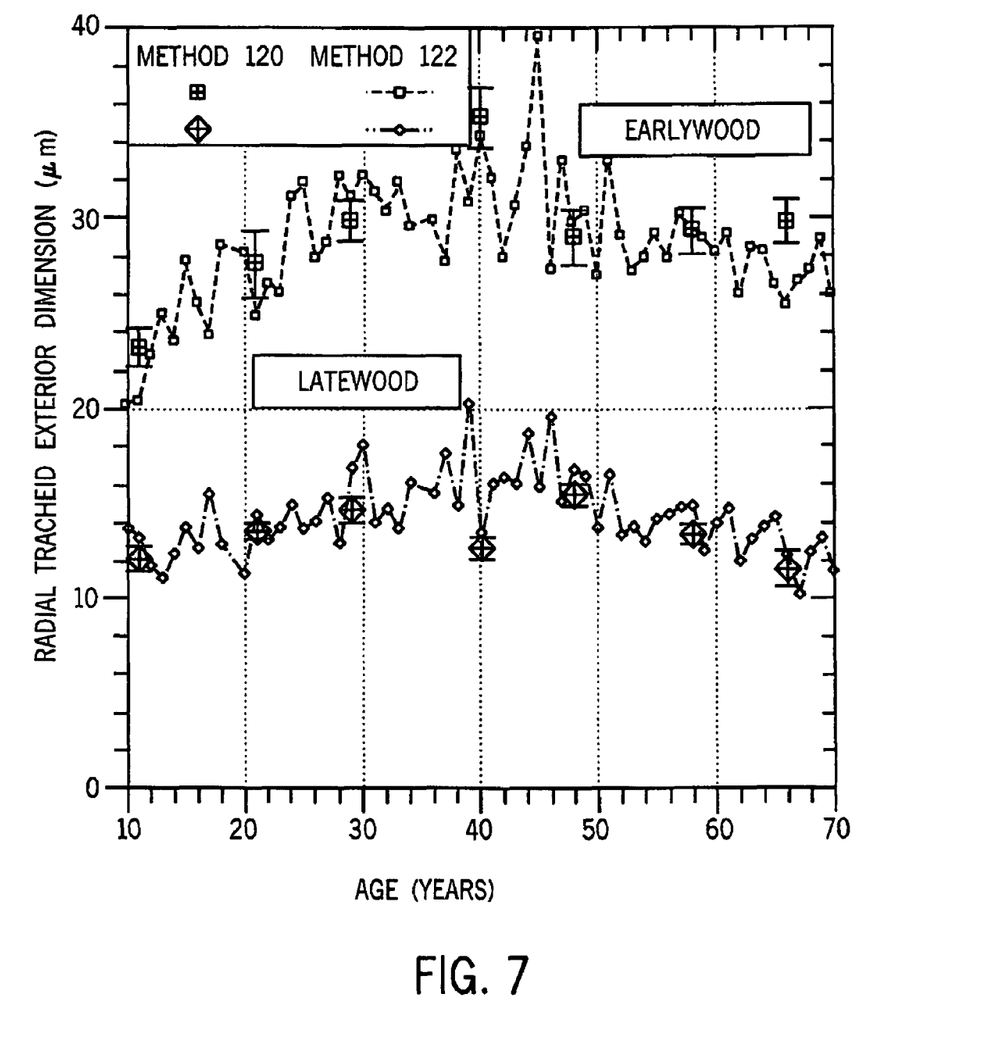
FIG. 7 is a graph plotting the radial tracheid exterior dimension of earlywood and latewood against the ring count of the wood sample.

Alternatively, the exterior tracheid dimension can be determined using a counting method 122. Specifically, at step 140, a line of markers, or dots, 56 extending along the tangential direction T is placed at each tracheid along the length T of the region of interest in the tangential direction T so as to fill the length of the region of interest, as illustrated in FIG. 5. The number of markers 56 identifies the number of rows of tracheids $N_t$ along the tangential direction. The average tangential exterior tracheid dimension is therefore calculated as the length per tracheid of the tangential direction within the region of interest $L_t/N_t$ at step 142. Similarly, a line of dots 58 extending along the radial direction R identifies the number of rows of tracheids $N_r$ that fill the length R of the region of interest 48 in the radial direction. The average radial exterior tracheid dimension is therefore the length per tracheid of the radial direction within the region of interest $L_r/N_r$. FIG. 7 shows the radial tracheid exterior dimension of both the earlywood 42 and latewood 44 of the rings plotted against the number of rings in the sample of the tree that was tested, obtained using both methods 120 and 122.

Figure 8A:
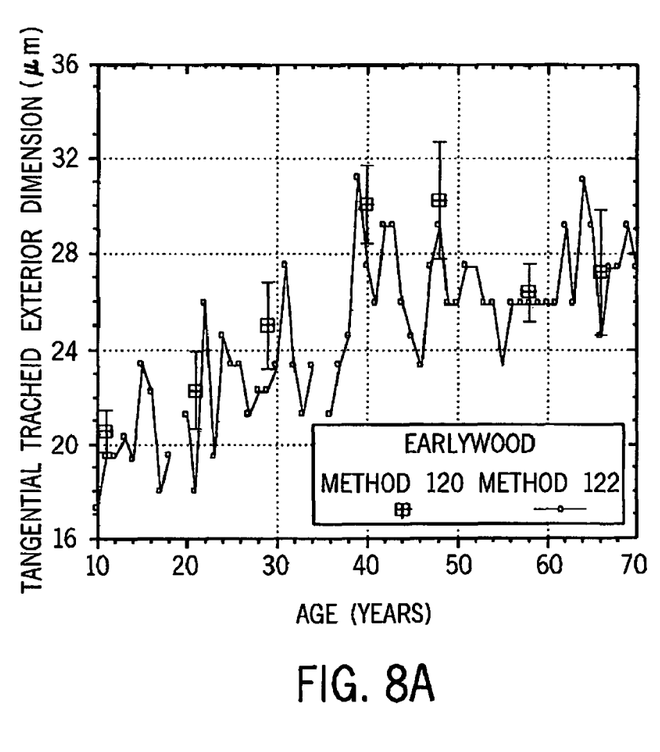
FIG. 8A is a graph plotting the tangential tracheid exterior dimension of earlywood against the ring count of the wood sample.
Figure 8B:
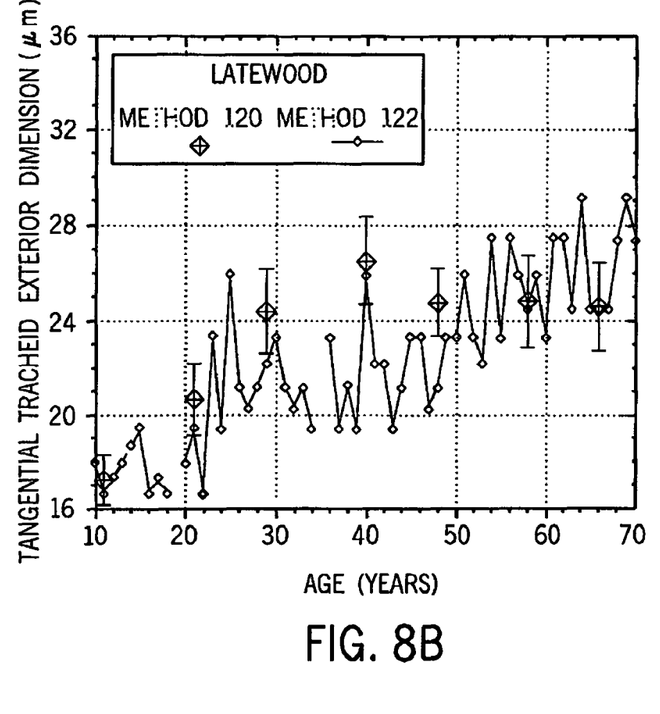
FIG. 8B is a graph plotting the tangential tracheid exterior dimension of latewood against the ring count of the wood sample.
Figure 9:
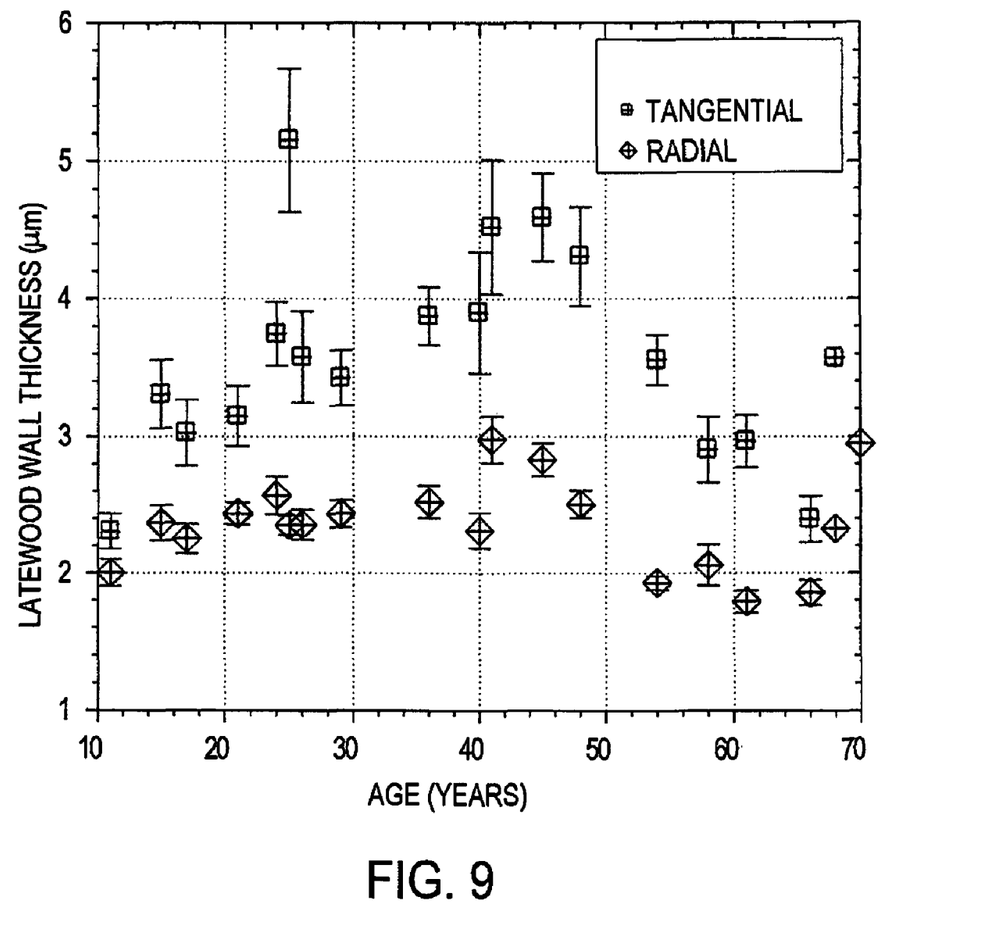
FIG. 9 is a graph plotting the tangential and radial wall thicknesses of latewood against the ring count of the wood sample.

FIG. 7 shows the trend of earlywood and latewood radial exterior dimension over the life of the tree for methods 120 and 122. FIGS. 8A and 8B show the tangential tracheid exterior dimension of both the earlywood 42 and latewood 44 plotted against the number of rings in the sample of the tree that was tested, using both methods 120 and 122. The tangential and radial wall thicknesses as determined using method 120 are plotted against the number of rings of the tree sample in FIG. 9.

Conventionally, the tangential wall thickness had been determined using a formula that did not include the anisotropy of the tracheid, which is equal to the tangential wall thickness divided by the radial wall thickness. The conventional formula calculated a single value for wall thickness and that value was applied to both radial and tangential wall thickness. Unfortunately, however, the tangential wall thickness typically is not equal to the radial wall thickness. As a result, the conventional formula produced significant error in the calculated tangential and radial wall thickness.

The wood density at the region of interest can be calculated using the steps of method 124. Method 124 is first applied to a set of calibration samples, then to the sample 24 being tested. Specifically, at step 144, the grey-level image in the region of interest 48 is thresholded to convert the image to a binary image, with, for example, the white region representing wall material, and the dark region illustrating the lumen and other non-tracheid area. Next, at step 146, the areas of the white regions and the overall area of the region of interest 48 can be calculated, and the fractional area coverage of the tracheid walls can be calculated as the area of the white region divided by the overall area of the region of interest. Specifically, the areas can be calculated by the Optimas Software, which counts the white pixels and assigns an area to each based on the special calibration of the image field of view. Finally, at step 148, the density of the wood sample 24 at the region of interest 48 is therefore calculated as the fractional area coverage of the tracheid wall times the nominal density of cellulose, which is taken to be 1.5 g/cm$^3$.

The thresholding step 144 will now be described in more detail. The image region to be thresholded can be processed by the software to produce a histogram indicating the number of pixels representing specific gray values without regard to their spatial location. Typically, the images of wood growth rings produce bimodal histograms, with large numbers of darker gray values representing lumen areas and lesser but still significant numbers of brighter gray values representing wall areas. Gray values between the histogram peaks associated with the lumens and the walls are generally poorly represented, and the minimum gray value in the histogram is generally a good starting point for selection of a threshold gray value. Based on this selection, method 124 is concluded in step 148 to produce a trial value for density in the image region of interest. An improvement on this trial value can be the result of a calibration exercise using one or more calibration samples or even one or more calibration images from the same sample. It is recognized that the density characteristics of a normal-growth tree are easier and more reliable to determine than those of a suppressed-growth tree using conventional techniques. Furthermore, it is believed that the density characteristics of a normal-growth tree are substantially equal to or similar enough to those of a suppressed-growth tree of the same species such that the procedure for determining the threshold that accurately separates the wall material from the remaining portions of the calibration sample will be consistent with the procedure for determining the threshold that accurately separates the wall material from the remaining portions of the sample 24 being tested.

A calibration sample is thus procured that is of the same species as the sample 24 being tested. Using the minimum gray value between the peaks of a bimodal histogram as the starting threshold, the density associated with an image of the calibration sample is determined according to step 148 of method 124. This density can be compared to the true density of the sample determined in one of several ways. For instance, x-rays can be introduced into the sample at the region corresponding to the image area of interest and the number of transmitted rays versus the number of incident rays can be determined, thus providing the density of the sample in accordance with conventional practice. Alternatively, the rings of the sample can be sectioned in the region of interest, with the section measured for its volume and weighed to determine its mass, with density given as the mass divided by the volume. Alternatively still, if the wall coverage area is known for a region of interest (for instance, using method 120), the known density of cellulose can be used to determine the density of the calibration sample.

The difference between the trial density and the true density of a calibration sample can be the basis for improving the process of threshold selection. For example, it may be determined that a threshold half way between the trial threshold and the gray value corresponding to the darker of the peaks of the bimodal histogram produces a density measurement that is in agreement with the true density. In measuring subsequent samples, the trial threshold can be calculated as a point midway between the dark peak and the valley between the two peaks of the histogram. This recommendation holds even if the peaks and the valley between them do not have the same gray values that they had in the calibration image. In general, one can test a number of calibration samples and determine the best threshold resulting in agreement with the true density of each of them. For each calibration sample, one may also note as many distinctive features of the histogram as possible. These include but are not limited to the histogram average gray value and the gray values for the darker bimodal peak, the brighter bimodal peak and the minimum of the valley separating them. One can also note, for example, the number of pixels at each of these gray values. One can then determine by conventional methods an algorithm for calculating the best threshold for any combination of measurable histogram features. This algorithm can be applied to an unknown sample 24 of the same species. The sample 24 is then imaged in the manner described above, and the threshold process 144 determined during the calibration is applied to the histogram of the image to determine the threshold. Next, at step 146, the fractional area of tracheids is calculated (again, as area of total coverage by the white region of the image). Finally, at step 148, the density of the wood sample 24 at the region of interest 48 is calculated as the fractional area coverage of the tracheid wall times the nominal density of cellulose, which is taken to be 1.5 g/cm$^3$.

It should be appreciated that a single calibration sample could provide a number of calibration images. For example, an earlywood and latewood calibration image can be obtained from each normal growth ring. The algorithm for calculating the optimum threshold may be different for earlywood and latewood. The appropriate algorithm should be applied to earlywood and latewood images of the unknown sample 24. It should be appreciated that while the calibration sample is ideally of the same species as the sample to be tested, the algorithm for threshold determination may be broadly applicable between species. For example, if the best threshold is found to be the gray value at the minimum between the bimodal peaks of the gray value histogram, and this applies for multiple species, one may confidently apply this learning to new species without requiring additional calibration exercises.

It should be appreciated that certain aspects of the present invention enable the measurement of various anatomical properties of tree sections using an image acquisition assembly 30 and an image processing system. Because the wood sample 24 is fed through the image acquisition system, and the image processing system 33 produces an image of the wood sample 24 and, based on the image, determines the various anatomical properties of the wood section, the present invention could advantageously analyze several wood samples 24 from, for example, various regions of a given tree in an automated manner to achieve an anatomical profile of the tree. For instance, once a first sample 24 is fed through the data acquisition assembly 30, subsequent wood samples could then be fed through the assembly and analyzed using the image processing system 33 in the manner described above.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A method for determining anatomical properties of a tree having a plurality of growth rings spaced from each other in a radial direction, the steps comprising:
    A) providing a wood sample of the tree, the wood sample including at least one growth ring comprising a plurality of tracheids, each tracheid having a tracheid wall, the growth ring defining an earlywood portion and a latewood portion;
    B) providing an imaging system comprising a light source configured to sequentially illuminate substantially all of the tracheids of substantially all of the growth rings by directing the light source to the side of the wood sample; a camera configured to sequentially acquire images of at least part of the latewood and earlywood portions of substantially all of the growth rings; and a computer receiving signals from the camera, the computer running a software configured to determine at least one anatomical property of the sample, the anatomical property being selected from the group consisting of sample density one or more tracheid wall thicknesses, and one or more tracheid exterior dimensions;
    C) sequentially capturing images of substantially all of the earlywood and latewood portions of substantially all of the growth rings in the sample, each image having a pixel resolution less than 2 μm; and
    D) determining at least one anatomical property of the sample, the anatomical property being selected from the group consisting of sample density, one or more tracheid wall thicknesses, and one or more tracheid exterior dimensions.

2. The method as recited in claim 1, wherein the pixel resolution is between 0.01 μm and 1 μm.

3. The method as recited in claim 1, wherein the pixel resolution is between 0.1 μm and 0.6 μm.

4. A method for determining anatomical properties of a tree having a plurality of growth rings spaced from each other in a radial direction, the steps comprising:
    A) providing a wood sample of the tree, the wood sample including at least one growth ring comprising a plurality of tracheids, each tracheid having a tracheid wall the growth ring defining an earlywood portion and a latewood portion, adjusting a positioning system having a known spatial adjustment to translate the sample from a leading edge of the growth ring to a trailing edge of the growth ring;
    B) providing an imaging system comprising a light source configured to sequentially illuminate substantially all of the tracheids of substantially all of the growth rings in the sample by directing the light source to the side of the wood sample; a camera configured to sequentially acquire images of at least part of the latewood and earlywood portions of substantially all of the growth rings, and a computer receiving signals from the camera, the computer running a software configured to determine at least one anatomical property of the sample, the anatomical property being selected from the group consisting of sample density, one or more tracheid wall thicknesses, and one or more tracheid exterior dimensions;
    C) sequentially capturing images of substantially all of the earlywood and latewood tracheids of substantially all of the growth rings in the sample, each image having a pixel resolution less than 2 μm; and
    D) determining the radial thickness of the ring based on the spatial adjustment needed to translate the sample from the leading edge to the trailing edge.

5. The method as recited in claim 1, further comprising the step of reducing lighting nonuniformity across the image.

6. The method of claim 1, further comprising the step of selecting a region of interest in the image, the region of interest including tracheids of only one of the earlywood and latewood portions of the sample.

7. The method of claim 6, wherein the step of determining the tracheid wall thickness further comprises:
    placing at least one marker across a number of tracheid walls within the region of interest;
    measuring luminance values along the marker;
    determining locations along the marker where the luminance values are greater than a rolling average luminance value; and
    calculating an average wall thickness based on the thickness of the determined locations divided by the number of tracheid walls.

8. The method as recited in claim 6, further comprising determining a number of tracheids along a direction within the region of interest, comprising the step of plotting a plurality of markers on the image along a direction in the region of interest, each marker corresponding to a tracheid interior dimension and a thickness of one double wall adjacent to the interior boundary in the predetermined direction in the region of interest, and determining the length of the marker.

9. A method for determining anatomical properties of a tree having a plurality of growth rings spaced from each other in a radial direction, the steps comprising:
    A) providing a wood sample of the tree, the wood sample including substantially all of the growth rings of the tree, each growth ring comprising a plurality of tracheids, each tracheid having a tracheid wall, wherein the growth ring comprises an earlywood portion and a latewood portion;
    B) providing an imaging system comprising a light source configured to sequentially illuminate substantially all of the tracheids of substantially all of the growth rings by directing the light source to the side of the wood sample; a camera configured to sequentially acquire images of at least part of the latewood and earlywood portions of substantially all of the growth rings of the sample; and a computer receiving signals from the camera, the computer running a software configured to determine at least one anatomical property of the sample, the anatomical property being selected from the group consisting of sample density, one or more tracheid wall thicknesses, and one or more tracheid exterior dimensions;
    C) sequentially capturing images of substantially all of the earlywood and latewood portions of substantially all of the growth rings in the sample, each image having a pixel resolution less than 2 μm; and
    D) determining at least one anatomical property of the sample the anatomical property being selected from the group consisting of sample density, one or more tracheid wall thicknesses, and one or more tracheid exterior dimensions, wherein the step of determining the tracheid exterior dimension further comprises determining an average exterior dimension of the tracheids within the region of interest along a predetermined direction, the step comprising:

plotting a plurality of markers on the image along a direction in the region of interest, each marker corresponding to a tracheid along the predetermined direction;

counting the number markers; and dividing the length of the region of interest along the predetermined direction by the number of markers.

10. The method as recited in claim 9, wherein the markers extend radially.

11. The method as recited in claim 10, wherein the markers extend tangentially.

12. A method for determining anatomical properties of a tree having a plurality of growth rings spaced from each other in a radial direction, the steps comprising:

A) providing a wood sample of the tree, the wood sample including at least one growth ring comprising a plurality of tracheids, each tracheid having a tracheid wall, the growth ring defining an earlywood portion and a latewood portion;

B) providing an imaging system comprising a light source configured to sequentially illuminate substantially all of the tracheids of substantially all of the growth rings by directing the light source to the side of the wood sample; a camera configured to sequentially acquire images of at least part of the latewood and earlywood portions of substantially all of the growth rings; and a computer receiving signals from the camera, the computer running a software configured to determine at least one anatomical property of the sample, the anatomical property being selected from the group consisting of sample density one or more tracheid wall thicknesses, and one or more tracheid exterior dimensions;

C) sequentially capturing images of substantially all of the earlywood and latewood portions of substantially all of the growth rings, each image having a pixel resolution less than 2 μm; and D) determining at least one anatomical property of the sample based on the image, the anatomical property being selected from the group consisting of sample density, one or more tracheid wall thicknesses, and one or more tracheid exterior dimensions, wherein the step of determining the sample density comprises:

converting the image to a binary image to identify an area of tracheid wall material within a region of interest;

calculating the area of the tracheid wall material;

determining the fractional area coverage of the wall material; and multiplying the fractional area coverage of the wall material and a nominal density value for the wall material.

13. A method of determining an anatomical property of a wood sample, the steps comprising:

A) providing a wood sample including at least one growth ring, each growth ring comprising a plurality of tracheids, each tracheid having a tracheid wall;

B) providing an imaging system comprising a light source configured to sequentially illuminate substantially all of the tracheids of substantially all of the growth rings by directing the light source to the side of the sample; a camera configured to sequentially acquire images of at least part of the latewood and earlywood portions of substantially all of the growth rings; and a computer receiving signals from the camera, the computer running a software configured to determine at least one anatomical property of the sample based on the image, the anatomical property being selected from the group consisting of sample density, one or more tracheid wall thicknesses, and one or more tracheid exterior dimensions;

C) sequentially capturing images of a portion of substantially all of the growth rings of the sample, each image including a plurality of tracheids; and D) placing a marker across a number of tracheid walls within the image;

E) measuring luminance values along the marker;

F) determining locations along the marker where the luminance values are greater than a predetermined threshold; and G) calculating an average tracheid wall thickness based on the thickness of the determined locations divided by the number of tracheid walls.

14. The method as recited in claim 13, wherein the predetermined threshold is a rolling average luminance value.

15. The method as recited in claim 13, further comprising the step of identifying a number of tracheids along a predetermined direction within a region of interest, comprising plotting a plurality of markers on the image along a direction in the region of interest, each marker corresponding to a tracheid interior dimension and a thickness of one double wall adjacent to the interior boundary in the predetermined direction in the region of interest, and determining the length of the marker.

16. An apparatus for determining at least one anatomical property of a wood sample; the apparatus comprising:

a base supporting the wood sample, the wood sample having at least one growth ring comprising a plurality of tracheids; and an imaging system comprising:

a light source configured to sequentially illuminate substantially all of the tracheids of substantially all of the growth rings of the sample, wherein the light source is directed to the side of the sample;

a camera configured to sequentially acquire images of substantially all of the latewood and early-wood tracheids of substantially all of the growth rings, wherein the acquired image has a pixel resolution less than 2 μm, and a computer receiving signals from the camera, the computer running a software configured to determine at least one anatomical property of the sample based on the image, the anatomical property being selected from the group consisting of sample density, one or more tracheid wall thicknesses, and one or more tracheid exterior dimensions.

* * * * *